Patented May 5, 1936

2,039,802

UNITED STATES PATENT OFFICE 2,039,802

QUININE COMPOUND AND PROCESS OF MAKING THE SAME

Hans Kaufmann, Munster, Germany

No Drawing. Application September 5, 1934, Serial No. 742,763. In Germany February 3, 1934

3 Claims. (Cl. 260—26)

This invention concerns a process of producing a quinine compound.

The employment of quinine is rendered considerably difficult by reason of its bitter taste. While the free alkaloid is tasteless, so that it might well be used, the soluble salts which are, primarily, those practically to be used have a strongly bitter taste. Of the several endeavors to deprive the quinine of its bitter taste, mention may here be made of the much used quinine carbondioxide ester which has been produced by treating quinine with chlorine carbon dioxide ethyl ester. The free base obtained is tasteless but its salts are very bitter.

Now I have discovered that a compound sufficiently soluble in water, as well as nearly tasteless so as to be adapted to be used as a medicament can be obtained by introducing a diethyl-acetyl group into the quinine. There may be employed the usual methods of the acylation that is to say, the conversion of the quinine with halogenides of diethyl-acetic acid, with or without the employment of acid-binding agents as well as the action of the acid anhydride upon quinine. The most favorable results were obtained by the first-mentioned process, which can be carried out in cold state, as well as in hot state. Not only the new compound but also the salts thereof which, as for instance the hydrochloric acid salt, are soluble in water in a degree sufficient for the therapeutic application are nearly tasteless, wherein resides an important technical progress.

Examples (1) 3,2 parts of water-free quinine are dissolved in dry benzol with the application of heat, and thereafter 2 parts of diethyl-acetyl chloride are gradually added. After the heating in a water-bath the solvent is distilled off, the residue is taken up with a little water, then the solution is washed with a little ether in order to remove the surplus of the acid chloride, is concentrated, and finally permitted to crystallize. The diethyl-acetyl-quinine hydrochloride crystallizes with 2 molecules of water in the form of pure white needles having a fusing point of 114° C. after a sintering has taken place at about 96° C. The new substance is comparatively well soluble in water, alcohol and chloroform, but insoluble in ether and petroleum-ether. For producing the free base the hydrochloride is dissolved and ammonia is added. After treating with ether and evaporation of this separated solvent the free base remains at first in a tough and smeary state, but by and by it becomes brittle and can be ground to a white powder.

(2) If the process is to be carried out in the cold, 3,2 parts of quinine are suspended in the 5-fold quantity of benzol and the acid chloride is added in excess. After the mixture has been left to itself for 12 hours at room temperature the solvent is drawn off by suction. The residue is finally recrystallized with the aid of dilute alcohol. The substance thus obtained is the hydrochloride of the new compound which contains only 1 molecule of water and has a fusing point of about 142° C.

It is known that quinine contains in its molecule two nitrogen-containing ring systems connected to one another by a secondary alcohol group and the process forming the basis of the present invention results in introducing a diethyl acetyl group into such secondary alcohol group, that is, in esterifying the quinine. It will be understood that the term a quinine ester in this case is a broad term applicable not only to quinine itself, but also to its salts.

It will be understood that although in the above examples I have described two different ways in which the process may be carried out, such examples are to be considered merely as illustrative and not as limiting the invention to specific details. For an understanding of what I believe to be new and my invention, reference is to be had to the following claims.

I claim:

1. The process of producing a quinine compound which consists in esterifying the secondary alcohol group of quinine with a di-ethyl acetyl group.
2. A di-ethyl acetyl quinine ester.
3. Di-ethyl acetyl quinine.

HANS KAUFMANN.